United States Patent [19]

Shibata

[11] 4,242,135

[45] Dec. 30, 1980

[54] ELECTRICAL CONTACT MATERIALS OF INTERNALLY OXIDIZED AG-SN-BI ALLOY

[75] Inventor: Akira Shibata, Yokohama, Japan

[73] Assignee: Chugai Denki Kogyo Kabushiki-Kaisha, Japan

[21] Appl. No.: 61,846

[22] Filed: Jul. 30, 1979

[30] Foreign Application Priority Data

Aug. 11, 1978 [JP] Japan ............................... 53-097363

[51] Int. Cl.$^3$ ......................... B32B 15/00; C22C 5/10

[52] U.S. Cl. ................................ 75/173 A; 75/173 R

[58] Field of Search .......................... 75/173 C, 173 A

[56] References Cited

U.S. PATENT DOCUMENTS

| | | | |
|---|---|---|---|
| 2,673,167 | 3/1954 | Vines | 148/32 |
| 3,933,486 | 1/1976 | Shibata | 75/173 A |
| 4,072,515 | 2/1978 | Motoyoshi et al. | 75/173 A |
| 4,150,982 | 4/1979 | Shibata | 75/173 A |

*Primary Examiner*—L. Dewayne Rutledge
*Assistant Examiner*—Upendra Roy
*Attorney, Agent, or Firm*—Shlesinger, Fitzsimmons & Shlesinger

[57] ABSTRACT

Internally oxidized Ag-Sn-Bi alloy electrical contact materials are improved of their tensile strength and rate of consumption by the addition of 0.1–8.5 weight % of Cu, whereby they present stable contact resistance and less amount of consumption. The alloy may comprise 0.01–0.5 weight % of one or more elements of the iron family.

2 Claims, No Drawings

ELECTRICAL CONTACT MATERIALS OF INTERNALLY OXIDIZED AG-SN-BI ALLOY

This invention relates to an improvement of electrical contact materials or electrical contacts thereof, which are consisted of a silver alloy comprising Sn or Bi and which are internally oxidized.

Such electrical contact materials which are consisted of an Ag alloy comprising Sn and Bi and which are made by internal oxidation, are described in U.S. Pat. No. 3,933,486, inventorship of which belongs to the present inventor. It had been known that a silver alloy containing more than 3 weight % of Sn could not be internally oxidized well, and could not produce an acceptable internally oxidized electrical contact material, on account of its poor crystalline structure. It has become possible in accordance with the aforementioned invention, to produce a high refractory, internally oxidized contact material made from a silver alloy containing more than 3 weight % of Sn, by the addition of Bi to said alloy. The addition of a small amount of Bi to such silver alloy is accompanied with phenomena that it can retard the growth of silver crystalline grains, resulting in making the silver crystalline grains small, and can not precipitate metal oxides within the silver crystalline grains but can produce the precipitation of metal oxides around the silver grain boundaries. Such phenomena are due to the fact that Bi can make a solid solution with Sn at a high temperature but its solid solubility with Sn and with Ag at a normal temperature is extremely small, and that oxygen diffusion velocities are fast around silver grain boundaries than within the grains.

Though such internally oxidized Ag-Sn-Bi alloy is commercially and industrially acceptable as an electrical contact, it is not entirely satisfactory with respect to points that tin oxides precipitated around silver grain boundaries make it brittle as a whole, on account of their high hardness, and that as they have high refractoriness (decomposing at about 2,000° C.), its contact resistance can not always be stable, resulting in sometimes its abnormal consumption, when it is used with switches having a low contact pressure.

It is, therefore, an object of this invention to provide an internally oxidized Ag-Sn-Bi alloy electrical contact material having a more stable contact resistance and a lesser consumption rate, by means of adding to said alloy an auxiliary metal element which can improve mechanical characteristics of the material, such as tensile strength, elongation and so on.

In order to achieve this object, it was found that the auxiliary metal element had to satisfy the following conditions.

(1) Can be a solid solution with Ag, and be concomitant with Sn, (2) Can make metal oxides having vapor pressure higher than tin oxides and a decomposition temperature lower than the melting point of Ag, (3) Increases handness of the alloy before the internal oxidation, and crystallization thereof, (4) Has no solid solubility with Bi at a normal or room temperature in order not to disturb internal oxidation mechanisms performed by Bi at silver grain boundaries, (5) Can make softer oxides than tin oxides, and (6) Has a low melting point, and does not disturb the crystallization of the silver alloy by Bi, As said auxiliary metal element, the present inventor has found Cu as most suitable. When Cu was added to an Ag-Sn-Bi alloy and internally oxidized, behaviors of Bi were never disturbed, resulting in producting fine crystalline structures in which the solute metal elements were precipitated around silver grain boundaries, and which have better tensile strength and rate of elongation.

A maximum amount of Cu has to be within its solid solubility with Ag at 779° C., viz., 8.8 weight %. It also has to be within such an amount which shall not lower unnecessarily excellent refractoriness which is inherent to an internally oxidized Ag-Sn-Bi alloy electrical contact material, due to tin oxides thereof. This amount would be 50% of tin, viz., 8.5 weight % of the total amount of alloy. Hence, the maximum amount of Cu in this invention is considered to be 8.5 weight %. As Cu of less than 0.5 weight % did not improve tensile strength and elongation rate of the contact material, its minimum amount is 0.5 weight %. This minimum amount could be further lessen when the alloy contains one or more element of the iron family, as described hereinafter.

The minimum amount of Sn which is other solute metal of this invention, is 3 weight %, since a silver alloy containing less than 3 weight % of Sn can be internally oxidized with stable structures, even without any addition of Bi. When the alloy contains more than 15 weight % of Sn, it can not completely be internally oxidized even in accordance with this invention, and the resulted alloy contact material becomes brittle. Hence, the maximum amount of Sn in accordance with this invention is 15 weight %. As to Bi, though its solid solubility with Ag at a high temperature is about 5.1 weight %, its maximum amount shall be 1.0 weight % so as to provide the alloy with an acceptable rate of elongation. Its minimum amount is 0.01 weight % so that it can achieve the above-mentioned function for precipitating the oxidized solute metals around silver grain boundaries.

Thus, this invention provides an electrical contact material consisting of a silver alloy comprising 3–15 weight % of Sn, 0.01–1.0 weight % of Bi, and 0.5–8.5 weight % of Cu, said alloy having been subjected to internal oxidation and having good tensile strength and elongation rate which result in affording to the alloy a stable contact resistance and low consumption rate.

When an amount of solute metals is comparatively large, the alloy would produce cracks when subjected to internal oxidation. In order to avoid this, the addition of less than 0.5 weight % of one or more elements of the iron family would be preferable. The maximum amount of said elements is 0.5 weight % since their solid solubility with Ag at a high temperature is said amount. Addition of less than 0.01 weight % of said elements of the iron family to the alloy can not affect well the recrystallization velocity of the latter.

When elements of the iron family are added to the alloy, a part of them makes an alloy with Cu which has solid solubility with Ag at a normal temperature, and it can therefore disperse well into silver matrices, resulting in further enhancing the fineness of crystallization of the alloy. As this results also in improving electrical characteristics of thus obtained contact materials, the amount of Cu could be reduced to 0.1 weight %.

Accordingly, this invention provides also an electrical contact material consisting of a silver alloy comprising 3–15 weight % of Sn, 0.01–1.0 weight % of Bi, 0.1–8.5 weight % of Cu, and 0.01–0.5 weight % of one or more elements of the iron family. While it is apparent from the above description and the following examples and test results that the present invention contact materials are novel and have excellent functions, it shall be noted that the electrical contact alloy materials in accordance with this invention can not be regarded in the same light as interanlly oxidized silver alloy contact material not containing Bi but containing Cu. As aforementioned, in this invention, Ag-Sn-Cu alloy containing Bi is internally oxidized, thereby Sn as well as Cu are oxidized and precipitated around fine silver crystalline grain boundaries, on account of Bi, and said oxidized Sn existing in a large amount has excellent refractoriness and said oxidized Cu gives improvements of mechanical characteristics and stable contact resistance to the resulted alloy. Contrarily to this, in case of an Ag-Sn-Cu alloy not containing Bi, internal oxidation of said alloy containing 7 weight % of Sn is absolutely impossible. The internal oxidation of said alloy containing about 5-3% of Sn proceeds, while its resulting contact material has irregular structures and can hardly be used as practically employable electrical contacts.

EXAMPLE

| Sample No. | Alloy (% in weight) |
|---|---|
| 1 | Ag-Sn 8.5%-Bi 0.2% |
| 1' | Ag-Sn 5%-Bi 0.2% |
| 1-1 | Ag-Sn 8.5%-Bi 0.2%-Cu 0.5% |
| 1-2 | Ag-Sn 8.5%-Bi 0.2%-Cu 4.2% |
| 2 | Ag-Sn 8.5%-Bi 0.2%-Fe 0.2% |
| 2-1 | Ag-Sn 8.5%-Bi 0.2%-Fe 0.2%-Cu 2% |
| 2-1' | Ag-Sn 5%-Bi 0.2%-Fe 0.1%-Cu 0.1% |
| 2-2 | Ag-Sn 8.5%-Bi 0.2%-Ni 0.2%-Cu 2% |
| 2-2' | Ag-Sn 5%-Bi 0.2%-Ni 0.1%-Cu 0.1% |
| 2-3 | Ag-Sn 8.5%-Bi 0.2%-Co 0.2%-Cu 2% |
| 2-3' | Ag-Sn 5%-Bi 0.2%-Co 0.1%-Cu 0.1% |
| 2-4 | Ag-Sn 8.5%-Bi 0.2%-Fe 0.1%-Ni 0.1%-Cu 2% |
| 2-5 | Ag-Sn 8.5%-Bi 0.2%-Fe 0.1%-Co 0.1%-Cu 2% |
| 2-6 | Ag-Sn 8.5%-Bi 0.2%-Ni 0.1%-Co 0.1%-Cu 2% |
| 2-7 | Ag-Sn 8.5%-Bi 0.2%-Fe 0.07%-Ni 0.07%-Co 0.07%-Cu 2% |

Alloy of the above Sample Nos. 1 to 2-7 were melted in a high frequency melting furnace at about 1,100° C.-1,200° C., and poured into a mold to obtain ingots of about 5 kg. Each ingots was stripped at its surface. Then, each ingots was welded at its stripped surface to a pure Ag plate, by means of a hydraulic press, platen of which was heated to about 400° C., and rolled to a plate of 2 mm in thickness while it was annealed at about 600° C. at every stages at rolling rates of 30%. This plate was completely internally oxidized in an oxygen atmosphere for 200 hours and at 650° C. Thus internally oxidized plates were pressed by a punch of 6 mm in diameter to obtain electrical contacts of 6 mm in diameter and of 2 mm in thickness.

Sample No. 1 which was consisted of an internally oxidized known alloy Ag-Sn-Bi, Sample Nos. 1—and 1-2 which were correspondent to Sample No. 1 but made in accordance with this invention, Sample No. 1' which consisted of another internally oxidized known alloy Ag-Sn-Bi and Sample No. 2 which was correspondent to Sample No. 1 but contained Fe, and Sample Nos. 2-1 to 2-7 which were correspondent to Sample No. 2 but made in accordance with this invention, were all tested of their anti-weldability and consumptions. Results are given in Table 1.

(1) Testing Conditions of Anti-Weldability

Voltage (D. C.) 240 V; initial current (discharge current from condenser electric source) 7,000 A; and contact pressure 200 g. Tests were made for 20 times of 5 sets of each samples. A pair of each samples were closed under the above contact pressure by a weight, and subjected to the above instantaneous discharge. The contacts were then opened by releasing therefrom the weight. If the contacts were not opened, it was determined that they were welded.

(2) Testing Conditions of Consumption in Accordance with a A.S.T.M. Test Method

Voltage (A. C) 200 V; current 50 A; contact pressure 400 g; releasing force 600 g; cycles 70 times per minute; and 50,000 cycles.

Tests were made for 5 sets each of each Samples. Their average consumptions and average voltage drops between stationary and movable contacts were measured. Voltage drops given in the Table 1 are average ones which were measured at each 10,000 cycles (at D. C. 6 V, 1 A).

TABLE 1

| Sample No. | Anti-weld test (times of welding) | A.S.T.M. consumption (mg) | Voltage drop (mΩ) |
|---|---|---|---|
| 1 | 0 | 32.1 | 6.72 |
| 1' | 0 | 21.5 | 3.6 |
| 1-1 | 0 | 18.0 | 3.24 |
| 1-2 | 0 | 16.4 | 2.41 |
| 2 | 0 | 24.3 | 4.32 |
| 2-1 | 0 | 12.1 | 1.60 |
| 2-1' | 0 | 8.9 | 0.95 |
| 2-2 | 0 | 13.4 | 0.91 |
| 2-2' | 0 | 6.4 | 0.64 |
| 2-3 | 0 | 9.6 | 0.81 |
| 2-3' | 0 | 7.5 | 0.81 |
| 2-4 | 0 | 14.5 | 1.24 |
| 2-5 | 0 | 13.1 | 1.32 |
| 2-6 | 0 | 9.1 | 1.65 |
| 2-7 | 0 | 8.6 | 1.73 |

Each 5 sets of each Samples were measured of their tensile strength and elongation rates. Results are given in the following Table 2, in which values are average ones of them. For this tests, the aforementioned alloy ingots were heated and rolled to wires of 2 mm in diameter. The wires were internally oxidized as described in the above. An Amsler testing machine was employed for said tests.

TABLE 2

| Sample No. | Tensile strength ($kg/mm^2$) | Elongation (%) |
|---|---|---|
| 1 | 15.4 | 0-0.2 |
| 1' | 18.7 | 0-0.5 |
| 1-1 | 26.1 | 0.3-0.9 |
| 1-2 | 28.2 | 0.8-1.8 |
| 2 | 18.4 | 0-0.3 |
| 2-1 | 25.1 | 0.8-3.1 |
| 2-1' | 25.9 | 4.3-5.2 |
| 2-2 | 28.5 | 0.7-2.5 |
| 2-2' | 26.4 | 3.2-4.3 |
| 2-3 | 22.9 | 0.8-2.1 |
| 2-3' | 29.1 | 3.3-6.0 |
| 2-4 | 23.1 | 0.9-1.2 |
| 2-5 | 23.5 | 0.8-1.6 |
| 2-6 | 24.1 | 1.1-1.5 |
| 2-7 | 19.3 | 1.4-2.0 |

It is apparent from the above Tables 1 and 2 that the electrical contact materials made in accordance with this invention are not inferior to the correspondent known materials at their anti-welding characters, and that both the former and the latter have excellent anti-weldability. It is also known that the former are superior to the latter at their consumption rates. This means that the present invention materials have stable contact resistance and less amount of consumption.

With respect to tensile strength and elongation, the present invention materials are better as much as 30-60% than the correspondent known materials.

Therefore, this invention provides electrical contact materials having excellent anti-weldability, as well as good mechanical characters such as tensile strength, elongation rate and so on, and presenting stable contact resistances.

What is claimed is:

1. An electrical contact material made from a silver alloy comprising 3-15 weight % of Sn, 0.01-1.0 weight % of Bi, and 0.5-8.5 weight % of Cu, said silver alloy having been internally oxidized.

2. An electrical contact material made from an internally oxidized silver alloy comprising 3-15 weight % of Sn, 0.01-1.0 weight % of Bi, 0.1-8.5 weight % of Cu, and 0.01-0.5 weight % of one or more elements of the iron family.

* * * * *